United States Patent [19]

Müller et al.

[11] Patent Number: 5,072,763
[45] Date of Patent: Dec. 17, 1991

[54] STUD LINK FOR A TIRE CHAIN HAVING RECESSES ON SIDES OF THE LINK BODY

[75] Inventors: Anton Müller; Günter Witzel, both of Aalen, Fed. Rep. of Germany

[73] Assignee: Eisen-und Drahtwerk Erlau Aktiengesellschaft, Fed. Rep. of Germany

[21] Appl. No.: 494,177

[22] Filed: Mar. 14, 1990

[30] Foreign Application Priority Data

Mar. 23, 1989 [DE] Fed. Rep. of Germany ... 8903692[U]

[51] Int. Cl.[5] .................. B60C 27/20; B60C 27/08
[52] U.S. Cl. ............................. 152/243; 152/231
[58] Field of Search ............. 152/171, 172, 222, 223, 152/225, 225 C, 233, 241, 242, 243, 244, 245, 231; 59/78, 84, 85, 87, 88, 90, 91, 92

[56] References Cited

U.S. PATENT DOCUMENTS

| | | | |
|---|---|---|---|
| 979,141 | 12/1910 | Evans | 152/244 |
| 1,447,064 | 2/1923 | Cousins | 59/85 |
| 1,512,518 | 10/1924 | Barrell | 152/243 |
| 1,588,533 | 6/1926 | Elzey | 59/85 |
| 4,836,259 | 6/1989 | Lewin et al. | 152/243 |
| 4,947,912 | 8/1990 | Weidler | 152/243 |

FOREIGN PATENT DOCUMENTS 3719751 1/1989 Fed. Rep. of Germany ...... 152/243

Primary Examiner—Michael W. Ball
Assistant Examiner—Gregory J. Wilber
Attorney, Agent, or Firm—Robert W. Becker & Associates

[57] ABSTRACT

A stud link is provided for a tire protection and/or antiskid chain, and includes a link body having at least one attachment opening for chain links that are to be attached to the stud link. The link body also has a wear portion that is provided with at least two recesses disposed next to one another on sides of the link body, with the recesses being spaced from one another in a longitudinal direction of the link body. At least a portion of the recesses have a groove-like configuration and extend at an angle relative to a transverse central plane of the link body.

17 Claims, 5 Drawing Sheets

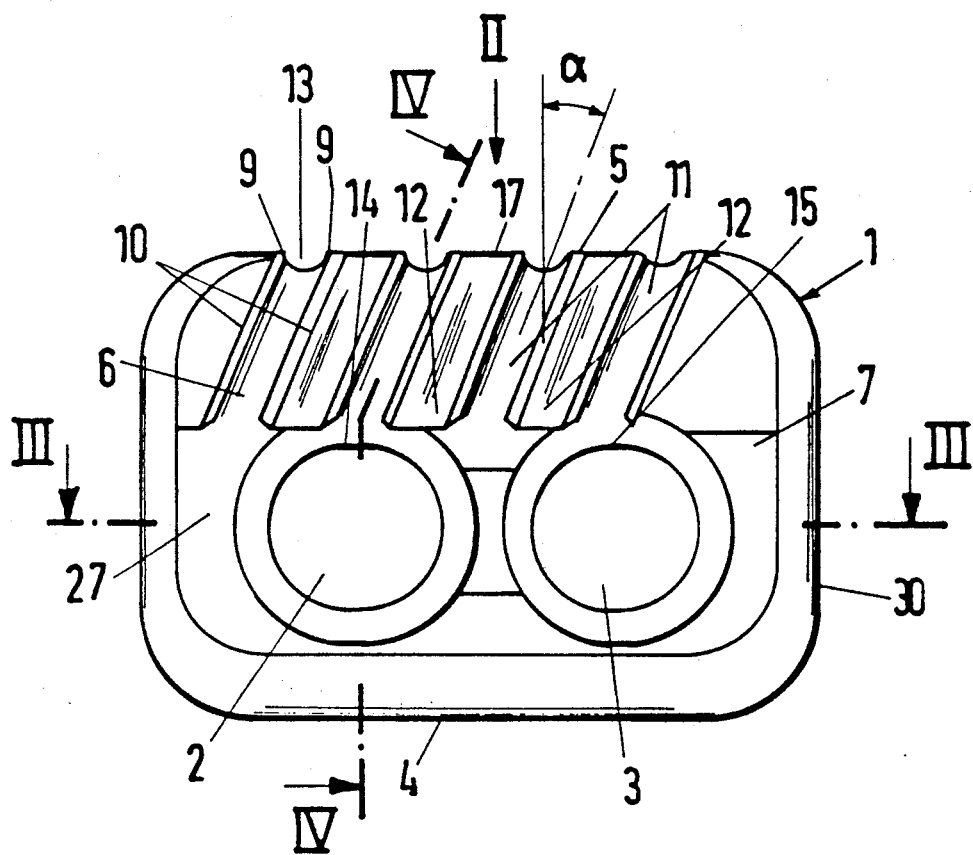

STUD LINK FOR A TIRE CHAIN HAVING RECESSES ON SIDES OF THE LINK BODY

BACKGROUND OF THE INVENTION

The present invention relates to a stud link for a tire protection and/or antiskid chain, including a link body having at least one suspension or attachment opening for chain links that are to be attached to the stud link, with the link body also having a wear portion that is provided with at least two recesses disposed next to one another on sides of the link body, with the recesses being spaced from one another in a longitudinal direction of the link body.

With one known stud link of this general type, the wear region, in the vicinity below the studs, is provided with a number of oval recesses that have a blind-hole type of construction and are successively disposed at a distance from one another in the longitudinal direction of the link body. Before a smooth, continuous wear surface is formed as a result of the wear of the studs, these openings become effective. The openings then form a structured wear surface at which, however, no excessively sharp edges and corners are formed. As a result, the traction of this known stud link is reduced as the wear increases. Since the recesses are short in the height direction of the stud link, an only corresponding small surface is available for the hardening of the wear portion that is normally to be undertaken, so that the wear property is not satisfactory.

It is a object of the present invention to provide a stud link of the aforementioned general type that over the entire height of the wear portion ensures a nearly uniformly high traction while providing a large wear surface and improved resistance to wear.

BRIEF DESCRIPTION OF THE DRAWINGS

This object, and other objects and advantages of the present invention, will appear more clearly from the following specification in conjunction with the accompanying schematic drawings, in which:

FIG. 1 is a side view, approximately in actual size, of one exemplary embodiment of the inventive stud link;

FIG. 2 is a plan view taken in the direction of the arrow II in FIG. 1;

SUMMARY OF THE INVENTION

Figure 3:
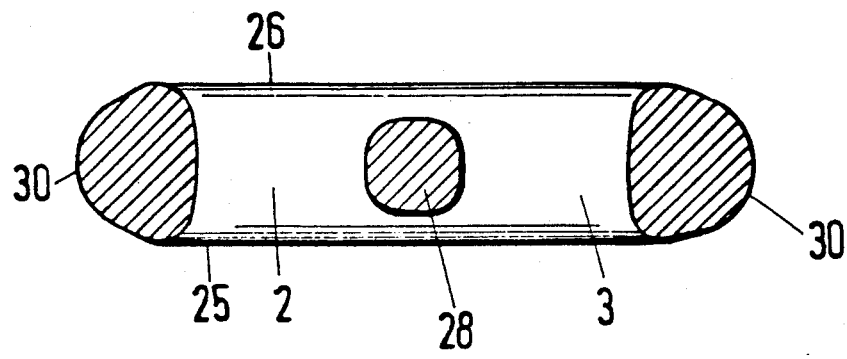
FIG. 3 is a cross-sectional view taken along the line III—III in FIG. 1.

The stud link of the present invention is characterized primarily in that at least a portion of the recesses have a groove-like configuration and extend at an angle to a transverse central plane of the link body.

As a consequence of the inventive construction, the recesses or grooves are inclined at an angle relative to the longitudinal direction of the link body. As a result, the grooves have a relatively great length and form long, sharp edges. They ensure a high traction and at the same time a high lateral stability and steering behavior of the stud link and the pertaining tire chain. As a result of the inventive construction, the recesses can be constructed relatively simply and as simple grooves, so that despite the high traction and without significantly reducing the strength of the stud link, the grooves form a highly profiled wear surface. In addition, without great expense, the grooves can be easily provided on the link body of the stud link. The recesses can be inclined in any desired manner relative to one another and to the link body in order in this manner to respectively ensure an optimum traction. As a result of the long grooves, a large surface for hardening is available in the wear portion. The stud link can therefore be optimally hardened, so that the stud link has a high resistance to wear.

Further specific features of the present invention will be described in detail subsequently.

DESCRIPTION OF PREFERRED EMBODIMENTS

Referring now to the drawings in detail, the stud link illustrated in FIGS. 1 to 4 serves as a wear link that together with other identical stud links, and ring links that connect them, are used in a link structure for tire protection and antiskid chains.

The stud link has a link body 1 with off center suspension or attachment openings 2, 3 that in the longitudinal direction of the link body 1 are spaced from one another; these attachment openings 2, 3 are for the (non-illustrated) ring or horizontal links of the tire chain that are to be connected. One of the longitudinal surfaces of the link body 1, in FIG. 1 the lower longitudinal surface 4, forms a tire abutment or contact surface via which the stud link rests against the tire. The opposite longitudinal surface 5 forms the wear surface that during use of the tire comes into contact with the ground or other surface below the tire.

The portion 6 of the link body 1 that is disposed between the attachment openings 2, 3 and the wear surface 5 forms a wear zone, the thickness of which is constantly decreased during use of the stud link due to wear. In this connection the longitudinal surface or wear surface of the stud link is continuously worn away, so that a new wear surface is always being formed. In order to ensure a high degree of traction for the stud link, the wear surface 5 and the side surfaces 7, 8 of the portion 6 of the link body 1 are provided with sharp corners 9, 9' and edges 10, 10'. These corners and edges are formed by groove-like recesses 11, 11' at the side surfaces 7, 8.

As shown in particular in FIG. 2, each of the grooves 11, 11' has a trapezoidal cross-sectional configuration. The grooves widen toward the outside. Formed between the grooves 11, 11' are respective lands or raised portions 12, 12' that are provided with the corners 9, 9' and the edges 10, 10'.

At the wear surface 5, the grooves 11, 11' open into transverse grooves 13 that preferably extend perpendicular to the longitudinal central plane L of the link body (see FIG. 2). The transverse grooves 13 preferably have a cross-sectional configuration that is concave in the shape of part of a circle (see FIG. 1), with the transverse grooves 13 preferably widening continuously in a direction from the longitudinal central plane L toward the side surfaces 7, 8 (see FIG. 2). The depth of the transverse grooves 13 is preferably less than the depth of the grooves 11, 11'. As can be seen from the plan view of FIG. 2, diamond-shaped studs 17 are formed between the transverse grooves 13; the end faces of the studs 17 form the wear surface 5.

The grooves 11, 11' essentially extend over the entire height of the wear portion 6 nearly to a transverse central plane that is tangent to the edges 14, 15 of the attachment openings 2, 3 that face the wear surface 5. Each of the grooves 11, 11' extends at a preferably identical acute angle of approximately 25° relative to a transverse plane Q that intersects the link body 1 at right angles. As shown in FIG. 2, the grooves 11 in the side surface 7 are disposed parallel to the grooves 11' in the side surface 8.

The grooves 11, 11' could also extend at an angle in opposite directions to one another. In addition, the grooves 11 could also have a different angle of inclination than do the grooves 11'. Thus, via a selection of the angle of inclination of the groove-like recesses 11, 11', an optimum adaptation of the traction to varying conditions of use can be achieved All of the grooves 11, 11' preferably have the same width and are spaced the same distance from one another, so that the stud link has the same traction characteristics over its entire length. However, depending upon the desired application, it is, of course, also possible for the grooves 11, 11' to have different widths and/or be spaced different distances from one another.

As a consequence of the angled arrangement of the grooves 11, 11', not only are the sharp corners 9, 9' formed at the wear surface 5, but also a high traction is ensured. The grooves 11, 11' as well as the transverse grooves 13 provide the wear surface 5 with a distinct structure that imparts a high traction to the stud link even after a long period of use and great wear of the studs 17 that are formed in the region of the transverse grooves 13. The grooves 11, 11' can have a relatively slight depth so that they do not lead to any significant reduction in the cross-sectional area of the stud link. Until the studs 17 are worn down, the transverse grooves 13 ensure the high traction of the stud link in the region of the wear surface 5, because due to the transverse grooves 13 sharp edges are formed that extend transverse to the longitudinal direction of the stud link and that in addition extend in a V-shaped manner due to the diamond-shaped configuration of the studs 17. This ensures a particularly high traction.

When the studs 17 have been worn down, the wear surface 5 is continuous over the entire length of the stud link. The sharp edges 20, 20' formed by the lateral grooves 11, 11' now come into operation; as shown in FIG. 2, these edges 20, 20' extend over the length of the stud link in a somewhat meander like manner. Since the grooves 11, 11' extend over the entire height of the wear portion 6, these traction edges 20, 20' remain intact over the entire service life of the stud link. The approximately meander-like form furthermore contributes to a high traction and a high lateral stability.

Figure 4:
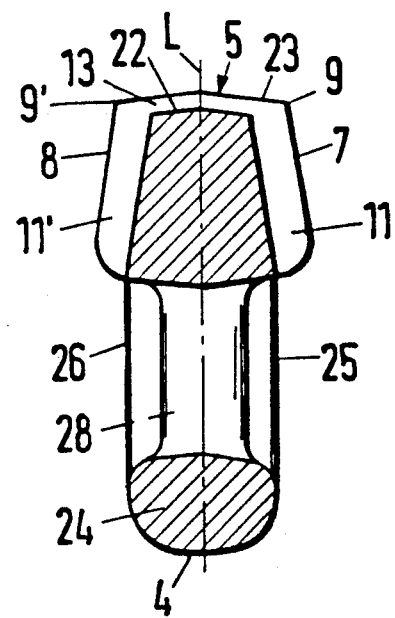
FIG. 4 is a cross-sectional view taken along the line IV—IV in FIG. 1.

The angled grooves 11, 11' make it possible to have a large hardening zone, because the lateral studs 21, 21' disposed between the grooves are relatively long over the height of the wear portion 6. This makes a relatively large surface available for the hardening in the wear portion 6. As a consequence of the transverse grooves 13, the surface that can be used for the hardening is even greater. As shown in FIG. 4, the side surfaces 7, 8 converge from the attachment openings 2, 3 in a direction toward the wear surface 5. As a result, as the stud link begins to wear, an increasingly larger wear volume becomes available, thereby increasing the service life of the stud link. The base 22 of the transverse grooves 13 is inclined in the shape of a roof (see FIG. 4). The end face 23 of the studs 17 also has a roof-shaped inclination. As furthermore shown in FIG. 4, the portion 24 of the stud link that is provided with the tire contact surface 4 is not as wide as the wear portion 6. The tire contact surface 4 merges in a continuously curved manner into parallel side surfaces 25, 26 of a central portion 27 of the stud link that contains the attachment openings 2, 3. The side surfaces 25, 26 merge in an S-shaped curved manner into the side surfaces 7, 8 of the wear portion 6.

The central part 28, which is disposed between the two attachment openings 2, 3 and connects the portion 24 of the stud link with the wear portion 6, is narrower than the portion 24 and the wear portion 6 (see FIGS. 3 and 4). As shown in FIGS. 2 and 3, the stud link tapers from the attachment openings 2, 3 in a direction toward the adjacent narrow ends 29, 30 of the link body 1, which narrow ends have a cross-sectional configuration that is curved in the shape of a partial circle.

Figure 5:
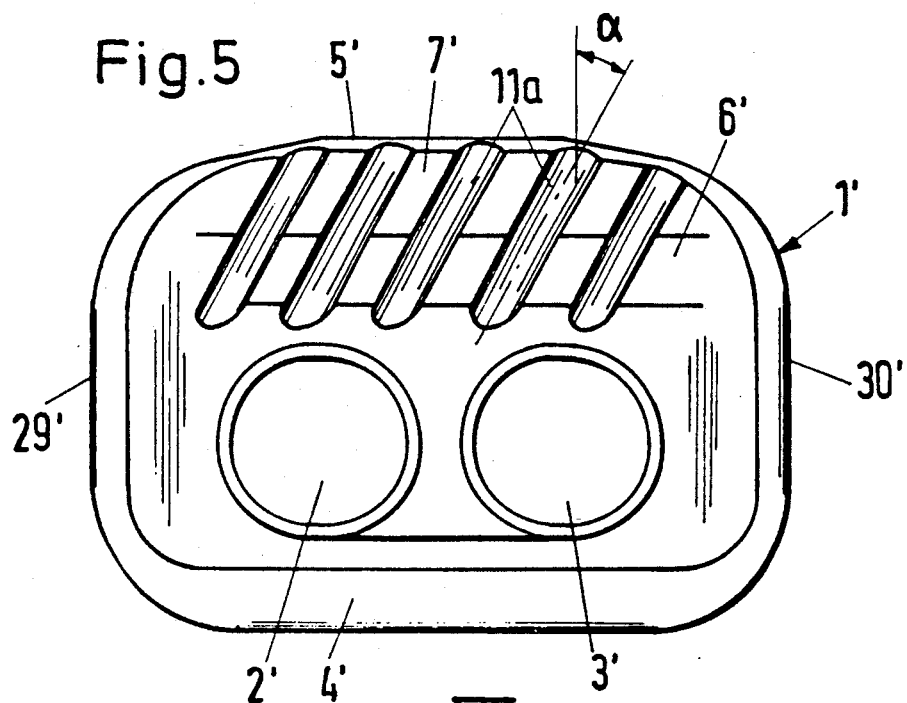
FIG. 5 is a side view of a second exemplary embodiment of the inventive stud link.
Figure 6:
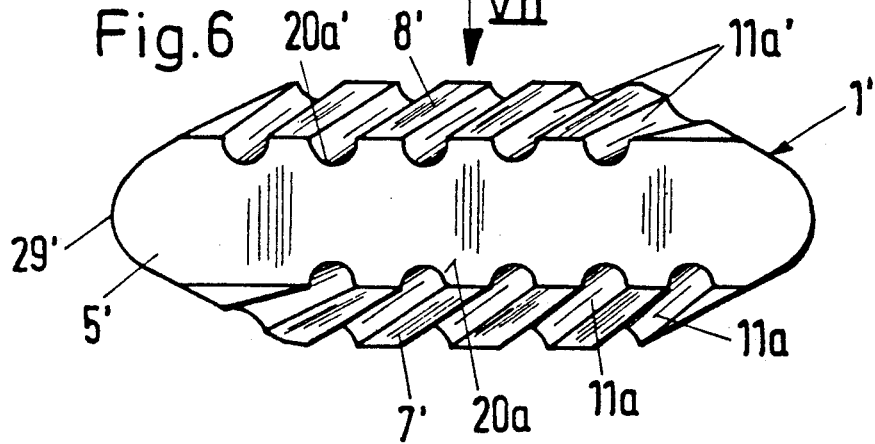
FIG. 6 is a top view of the stud link of FIG. 5.
Figure 7:
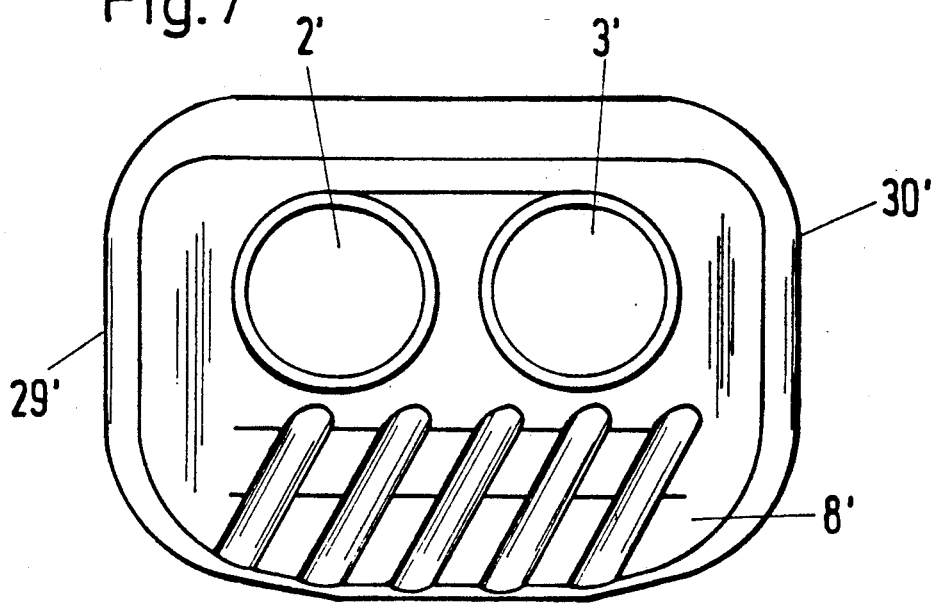
FIG. 7 is a side view taken in the direction of the arrow VII in FIG. 6.

The stud link illustrated in FIGS. 5 to 7 differs essentially from the previously described stud link in that no transverse grooves, and hence no studs, are provided in the wear surface 5'. The wear surface 5' is curved slightly convexly outwardly in the direction toward the narrow ends 29', 30' of the stud link. In addition, the attachment openings 2' and 3' are offset further downwardly in a direction toward the tire contact surface 4' than was the case with the stud link illustrated in FIGS. 1 to 4. As a result, a wider wear portion 6' is formed between the attachment openings 2', 3' and the wear surface 5'.

In the embodiment illustrated in FIGS. 5 to 7, the grooves 11a and 11a' in the side surfaces 7', 8' are angled in opposite directions relative to one another. Due to the fact that there are no transverse grooves, the wear surface 5' is continuous over the entire length of the stud link and is merely provided with the groove-like recesses 11a, 11a' at the side surfaces 7', 8', of the link body 1'of the stud link. The grooves 11a, 11a' differ from the grooves 11, 11' of the stud link of FIGS. 1 to 4 in that the grooves 11a, 11a' are curved in such a way that they have a cross-sectional configuration in the shape of approximately half of a circle. However, the grooves 11a, 11a' could also have the same cross-sectional configuration as do the grooves 11, 11' of the embodiment of FIGS. 1 to 4; conversely, the grooves 11, 11' could, of course, also have the cross-sectional configuration of the grooves 11a, 11a' of the embodiment of FIGS. 5 to 7. Since the grooves 11a, 11a' extend into the wear surface 5', the edges 20a, 20a' are again formed in the edge region of the wear surface 5'; these edges 20a, 20a' are formed by alternating linear and semicircular edge portions (see FIG. 6). In contrast to the previous embodiment, the edges 20a, 20a' are already operative from the beginning.

Also with this stud link, the grooves 11a, 11a', which extend over the height of the wear portion 6' and are inclined at an angle to the longitudinal direction of the link body 1', provide an additional hardening zone so that a high traction with a high lateral stability of the stud link is achieved. In other respects, this embodiment corresponds to the embodiment of FIGS. 1 to 4.

Figure 8:
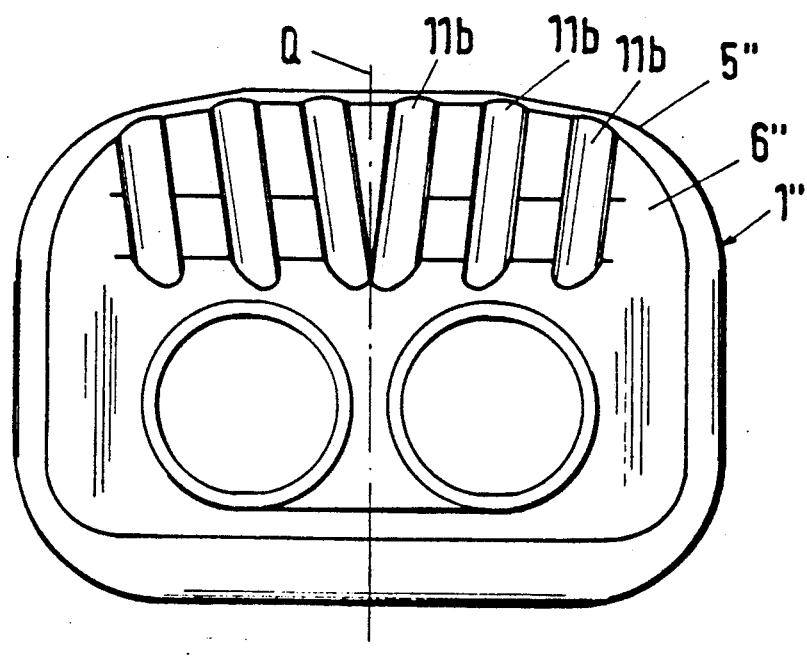
FIG. 8 is a side view of a third exemplary embodiment of the inventive stud link.
Figure 9:
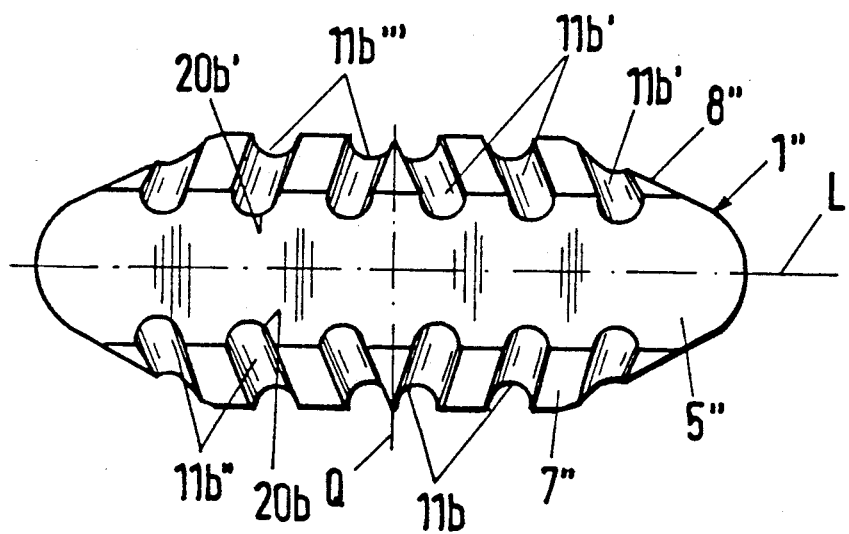
FIG. 9 is a plan view of the stud link of FIG. 8.

In the embodiment illustrated in FIGS. 8 and 9, the grooves 11b, 11b', 11b'', and 11b''' have a partially circular cross-sectional configuration in a manner similar to the grooves of the embodiment of FIGS. 5 to 7; the grooves 11b-11b''' essentially extend over the entire height of the wear portion 6''.

The link body 1'' of the stud link of the embodiment of FIGS. 8 and 9 corresponds to the link body 1' of the previously described stud link.

The essential difference from the previously described embodiment is that the grooves 11b-11b''', which are disposed on the side surfaces 7'', 8'' of the link body 1'', do not extend parallel to one another. Rather, merely those grooves 11b, 11b', and 11b'' and 11b''', which are disposed in a link body half to the right or to the left of the transverse central plane Q of the link body 1'', extend parallel to one another, whereas the respectively adjacent grooves that are disposed in the other link body half are inclined in opposite directions to the other grooves. Thus, the central, adjacent grooves 11b, 11b'' or 11b', 11b''' form an acute angle of approximately 30° with one another. With regard to the longitudinal central plane L, the grooves 11b, 11b'' of one longitudinal half of the link body 1', and the grooves 11b', 11b''' of the other longitudinal half, are disposed in a mirror symmetrical manner relative to one another.

As a consequence of this arrangement and position or inclination of the grooves 11b—11b''' relative to one another, a wear surface 5'' having a distinct profile and sharp longitudinal edges 20b, 20b' is formed that ensures a high traction and lateral stability of the stud link.

Figure 10:
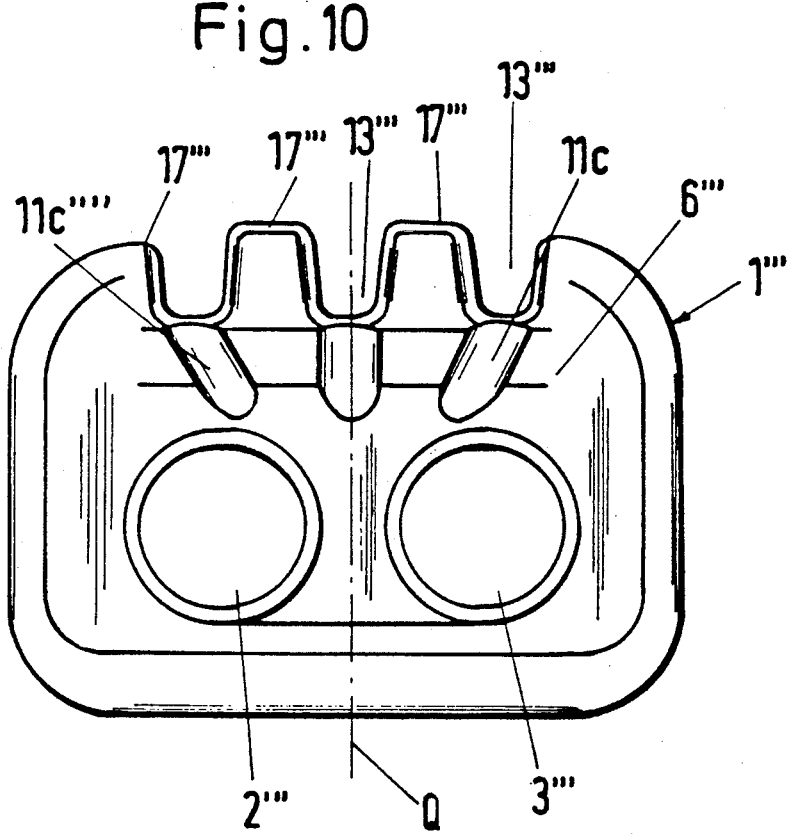
FIG. 10 is a side view of a fourth exemplary embodiment of the inventive stud link.
Figure 11:
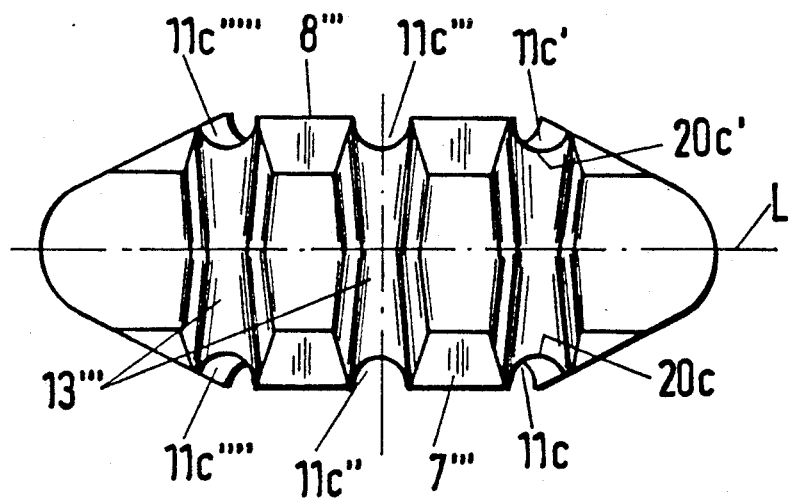
FIG. 11 is a plan view of the stud link of FIG. 10.

The stud link illustrated in FIGS. 10 and 11 has distinct studs 17''' that extend over approximately half of the height of the pertaining wear portion 6'' of the link body 1'''. In this embodiment, three transverse grooves 13''' are provided between the studs 17'''; like the transverse grooves 13 of the stud link of Figs. 1 to 4, these transverse grooves 13''' have an approximately double trapezoidal contour. The transverse grooves 13''' merge into the grooves 11c-11c''''' in the side surfaces 7''', 8'''. These grooves extend over only approximately half the height of the wear portion 6''' between the attachment openings 2''', 3''' and the transverse grooves 13'''. The grooves 11c-11c''''' are disposed similarly to the grooves 11b-11b''' of the embodiment illustrated in FIGS. 8 and 9. The grooves 11c and 11c' that are disposed in the right link body half (FIG. 11) are inclined at an angle outwardly, whereas the grooves 11c'''' and 11c''''' in the left link body half extend at an angle outwardly in the opposite direction. In contrast, the grooves 11c'' and 11c''' are centrally disposed in the link body and extend at right angles to the longitudinal central plane L of the link body 1'''.

As with the embodiment of FIGS. 1 to 4, the transverse grooves 13''' of the embodiment of FIGS. 10 and 11 extend perpendicular to the longitudinal central plane L. Respective sharp corners and edges are formed at the studs 17''' and at the grooves 11c-11c'''''. In addition, after the studs 17''' in the wear surface are worn down, the edges 20c, 20c' are formed that then assure the traction of the stud link in the manner described previously. In other respects, the stud link illustrated in FIGS. 10 and 11 has the same construction as does the stud link of the embodiments of FIGS. 1 to 4.

The present invention is, of course, in no way restricted to the specific disclosure of the specification and drawings, but also encompasses any modifications within the scope of the appended claims.

What we claim is:

1. In a stud link for a tire protection and antiskid chain, including a link body having at least one attachment opening for chain links that are to be attached to said stud link, with said link body also having a wear portion that is provided with at least two recesses disposed next to one another on sides of said link body, with said recesses being spaced from one another in a longitudinal direction of said link body, wherein the improvement comprises:

at least a portion of said recesses having a groove configuration with raised portions therebetween, said recesses and said raised portions extending at an angle relative to a transverse central plane of said link body, with said raised portions having sharp-edged corners and edges;

said stud link having a tire contact surface and a wear surface, said recesses being disposed between said attachment openings and said wear surface;

said wear portion provided with several wear studs disposed one after the other in the longitudinal direction of said link body; and in which transverse grooves are formed between said wear studs, with said recesses extending approximately from said attachment openings to a bottom of said transverse grooves; and said recesses opening into said transverse grooves.

2. A stud link according to claim 21, in which at least said recesses on one of said sides of said link body extend in a same direction.

3. A stud link according to claim 2, in which said recesses that extend in the same direction extend parallel to one another.

4. A stud link according to claim 2, in which said recesses on two of said link body sides extend in a same direction.

5. A stud link according to claim 1, in which said recesses on one side of said link body extend in an opposite direction to recesses on the other side of said link body.

6. A stud link according to claim 5, in which said recesses extend at a same acute angle.

7. A stud link according to claim 1, in which said recesses extend at an angle of between approximately 10° to 30° relative to said transverse central plane of said link body.

8. A stud link according to claim 21, in which said recesses essentially extend over an entire height of said wear portion of said link body.

9. A stud link according to claim 21, in which said transverse grooves extend at right angles to a longitudinal central plane of said link body.

10. A stud link according to claim 9, in which said transverse grooves have a double trapezoidal cross-sectional configuration.

11. A stud link according to claim 9, in which said transverse grooves are shallower than said recesses.

12. A stud link according to claim 1, in which said recesses have a cross-sectional configuration in the shape of part of a circle.

13. A stud link according to claim 1, in which recesses on opposite sides of said link body are inclined toward one another and a longitudinal central plane of said link body by an acute angle of approximately 10°.

14. A stud link according to claim 1, which has a tire contact surface and a wear surface, with said wear surface, when viewed in plan view, being provided with longitudinal edges that extend in a wavelike or meander-shaped manner.

15. A stud link according to claim 14, in which said recesses on one side of a longitudinal central plane are mirror symmetrical to said recesses on the other side of said longitudinal central plane.

16. A stud link according to claim 14, in which said recesses on one side of said transverse central plane are mirror symmetrical to said recesses on the other side of said transverse central plane.

17. In a stud link for a tire protection and antiskid chain, including a link body having at least one attachment opening for chain links that are to be attached to said stud link, with said link body also having a wear portion that is provided with at least two recesses disposed next to one another on sides of said link body, with said recesses being spaced from one another in a longitudinal direction of said link body, wherein the improvement comprises:

at least a portion of said recesses having a groove configuration with raised portions therebetween, said recesses and said raised portions extending at an angle relative to a transverse central plane of said link body, with said raised portions having sharp-edged corners and edges;

said stud link having a tire contact surface and a wear surface, said recesses being disposed between said attachment openings and said wear surface; and said recesses having a trapezoidal cross-sectional configuration.

* * * * *